(12) United States Patent
Carver

(10) Patent No.: US 9,011,627 B2
(45) Date of Patent: Apr. 21, 2015

(54) METHOD OF MANUFACTURING HIGH PERMITTIVITY LOW LEAKAGE CAPACITOR AND ENERGY STORING DEVICE

(71) Applicant: Carver Scientific, Inc., Baton Rouge, LA (US)

(72) Inventor: David Reginald Carver, Baton Rouge, LA (US)

(*) Notice: Subject to any disclaimer, the term of this patent is extended or adjusted under 35 U.S.C. 154(b) by 76 days.

(21) Appl. No.: 13/853,712

(22) Filed: Mar. 29, 2013

(65) Prior Publication Data

US 2013/0224397 A1    Aug. 29, 2013

Related U.S. Application Data

(63) Continuation-in-part of application No. 12/245,665, filed on Oct. 3, 2008, now Pat. No. 8,432,663, which is a continuation-in-part of application No. 13/671,546, filed on Nov. 7, 2012, now abandoned, and a continuation-in-part of application No. 13/599,996, filed on Aug. 30, 2012, now Pat. No. 8,633,289.

(60) Provisional application No. 60/978,067, filed on Oct. 5, 2007, provisional application No. 61/529,436, filed on Aug. 31, 2011.

(51) Int. Cl.
| | |
|---|---|
| *H01G 13/00* | (2013.01) |
| *H01G 4/04* | (2006.01) |
| *H02J 7/34* | (2006.01) |
| *H01G 4/018* | (2006.01) |
| *H01G 4/20* | (2006.01) |

(52) U.S. Cl.
CPC ............. *H01G 13/00* (2013.01); *H01G 4/04* (2013.01); *H02J 7/345* (2013.01); *H01G 4/018* (2013.01); *H01G 4/206* (2013.01)

(58) Field of Classification Search
CPC ............ H01G 13/00; H01G 4/04; H01G 4/18; H02J 7/345
USPC .......... 427/79–81, 532, 547; 156/272.2, 275.5
See application file for complete search history.

(56) References Cited

U.S. PATENT DOCUMENTS

| | | | | |
|---|---|---|---|---|
| 4,942,061 | A | * | 7/1990 | Domes .......................... 427/104 |
| 5,144,529 | A | * | 9/1992 | Takahashi ...................... 361/323 |
| 2006/0074164 | A1 | * | 4/2006 | Slenes et al. .................. 524/413 |
| 2012/0241085 | A1 | * | 9/2012 | Carver ......................... 156/275.5 |

* cited by examiner

*Primary Examiner* — Daniel McNally
(74) *Attorney, Agent, or Firm* — Mark Young, PA

(57) ABSTRACT

A method is provided for making a high permittivity dielectric material for use in capacitors. Several high permittivity materials in an organic nonconductive media with enhanced properties and methods for making the same are disclosed. A general method for the formation of thin films of some particular dielectric material is disclosed, wherein organic polymers are utilized to produce low conductivity dielectric coatings. Additionally, a method whereby the formation of certain transition metal salts as salt or oxide matrices is demonstrated at low temperatures utilizing mild reducing agents. Further, a circuit structure and associated method of operation for the recovery and regeneration of the leakage current from the long-term storage capacitors is provided in order to enhance the manufacturing yield and utility performance of such devices.

20 Claims, 5 Drawing Sheets

METHOD OF MANUFACTURING HIGH PERMITTIVITY LOW LEAKAGE CAPACITOR AND ENERGY STORING DEVICE

RELATED APPLICATION

This application is a continuation in part and claims the benefit of priority of U.S. Nonprovisional application Ser. No. 12/245,665 filed 3 Oct. 2008, which is a nonprovisional of and claims the benefit of and priority to U.S. Provisional Application 60/978,067, filed 3 Oct. 2007, and a continuation in part of U.S. Nonprovisional application Ser. No. 13/671,546, filed 7 Nov. 2012, and a continuation in part of U.S. Nonprovisional Ser. No. 13/599,996, filed 30 Aug. 2012, which is a nonprovisional of and claims the benefit of and priority to U.S. Provisional Application 61/529,436, filed 31 Aug. 2011, the entire contents of which are incorporated herein by this reference and made a part hereof.

FIELD OF THE INVENTION

This disclosure relates generally to capacitors and storage devices. More specifically, this disclosure relates a high permittivity low leakage capacitor and methods for forming the same.

BACKGROUND

In embodiments described herein, the following understanding of the nomenclature used in describing the present High Capacity Energy Storage Capacitors should be understood and considered. In older literature, the term "dielectric constant" of a material is used to describe the polarization ability or "permittivity" of the material when placed in an electric field. The term "dielectric breakdown" was used to describe the voltage at which an insulator material would "breakdown" and conduct current. This dielectric breakdown voltage is also known as the dielectric strength. Since the abbreviated version for both of these terms is "dielectric," and the material itself is called the dielectric, there was some confusion in the literature as to what was being discussed. Thus, the term "permittivity" is now used (mostly) to describe the ability of a material to charge polarize and change the "dielectric constant" of its volume of space to a higher value from that of a vacuum. Dielectric breakdown voltage is sometimes used to indicate the dielectric strength of the material.

The relative permittivity of a material is simply the measurement of its static dielectric constant divided by the dielectric constant of vacuum.

$$e_r = \frac{e_s}{e_0}$$

where:
$e_r$=relative permittivity
$e_s$=measured permittivity
$e_o$=electrical permittivity of vacuum (8.8542 E-12 F/m)

Thus, when the term good dielectric is used, this is meant (usually) to mean a material that displays good electrical insulation characteristics such as a high breakdown voltage and a low conductivity. A material that has a good "dielectric constant" for a capacitor means it has a good "permittivity" (high value) and increases the capacitance of a given size capacitor when placed between the electrodes by a "good" (high) amount.

A capacitor is formed when two conducting plates are separated by a non-conducting media, called the dielectric. The value of the capacitance depends on the size of the plates, the distance between the plates and the properties of the dielectric. The relationship is:

$$C = \frac{e_0 \cdot e_r A}{d}$$

$e_o$=electrical permittivity of vacuum (8.8542 E-12 F/m)
$e_r$=relative permittivity
A=surface of one plate (both the same size)
d=distances between two plates Whereas the electrical permittivity of a vacuum is a physical constant, the relative electrical permittivity depends on the material.

| Typical Relative Electrical Permittivities | |
| --- | --- |
| Material | $e_r$ |
| Vacuum | 1 |
| Water | 80.1 (20° C.) |
| Organic Coating | 4-8 |

A large difference is noticed between the electrical permittivity of water and that of an organic coating.

| Relative static permittivities of some materials at room temperature | |
| --- | --- |
| Material | Dielectric |
| Vacuum | 1 (by definition) |
| Air | 1.00054 |
| Polytetrafluoroethylene | 2.1 |
| Polyethylene | 2.25 |
| Polystyrene | 2.4-2.7 |
| Paper | 3.5 |
| Silicon dioxide | 3.7 |
| Concrete | 4.5 |
| Pyrex (glass) | 4.7 (3.7-10) |
| Rubber | 7 |
| Diamond | 5.5-10 |
| Salt | 3-15 |
| Graphite | 15-Oct |
| Silicon | 11.68 |
| Methanol | 30 |
| Furfural | 42 |
| Glycerol | 47-68 |
| Water | 88-80.1-55.3-34.5 |
| Hydrofluoric acid | 83.6 (0° C.) |
| Formamide | 84.0 (20° C.) |
| Sulfuric acid | 84-100 (20-25° C.) |
| Hydrogen peroxide | 128 aq-60 (−30-25° C.) |
| Hydrocyanic acid | 158.0-2.3 (0-21° C.) |
| Titanium dioxide | 86-173 |
| Strontium titanate | 310 |
| Barium strontium | 15 nc-500 |
| Barium titanate | 90 nc-1250-10,000 |
| (La Nb):(Zr Ti)PbO3 | 500, 6000 |

It is interesting to note that materials which have large dipole moments and high permittivity are often conductive salts or very polar inorganic acids or bases. In these cases their liquid form is difficult to use and/or toxic or corrosive. This makes their utility difficult and dangerous. Often the polar salts display undesirable conductivity when they are slightly impure and/or exposed to atmospheric conditions with humidity.

The inorganic salts which display nonconductive behavior and very high permittivities are inorganic salts of the transition metals and other inorganic salts that display high permittivities due to their crystal lattice structures. Use of these materials are difficult due to their crystalline nature. Much effort has been expended to make these types of material more manufacturable through the use of thin coatings and methods of high temperature fusing and sintering.

SUMMARY OF THE INVENTION

According to one or more features of the disclosure, a method is provided for making a high permittivity dielectric material for use in capacitors. Several high permittivity materials in an organic nonconductive media with enhanced properties and methods for making the same are disclosed.

According to one or more features of the disclosure, a general method for the formation of thin films of some particular dielectric material is disclosed, wherein the use of organic polymers, shellac, silicone oil, and/or zein formulations are utilized to produce low conductivity dielectric coatings. Additionally, in accordance with one or more features of the disclosure, a method whereby the formation of certain transition metal salts as salt or oxide matrices is demonstrated at low temperatures utilizing mild reducing agents.

Additionally, in accordance with one or more features of the disclosure, a circuit structure and associated method of operation for the recovery and regeneration of the leakage current from the long-term storage capacitors is provided in order to enhance the manufacturing yield and utility performance of such devices.

An exemplary method for creating a high permittivity dielectric material according to principles of the invention includes steps of creating a wetting agent solution by adding an amount an organic polymer to a solvent suspension and mixing the solution; processing the wetting agent solution to remove any particulate matter not dissolved into the solvent suspension; combining the wetting agent solution with a high permittivity dielectric particulate; mixing the wetting agent solution with the high permittivity dielectric particulate such that a slurry is created; applying the slurry to a substrate; and curing the slurry.

The organic polymer may be comprised of shellac, zein, silicone oil polymer, and/or poly-p-xylylene polymer, particularly a monatomic oxygen synthesized poly-p-xylylene polymer.

The high permittivity dielectric particulate may be a high permittivity inorganic salt, a compound from the group consisting of barium titanate, sodium borohydride, sodium borohydride and a borax salt, a transition metal salt, a Gd salt, Sr salt, Sn salt, and/or Fe salt.

Breakdown voltage adjuvants may be added to the slurry. Such breakdown voltage adjuvants may include Y, Ni, Sm, Sc, Tb, Yb, La, Te, Ti, Zr, Ge, Mg, Pb, Hf, Cu, Ta, Nb, and/or Bi.

To enhance permittivity, an electric and/or magnetic field may be applied across the substrate before completion of curing of the slurry. The strength of the electric field may be greater than 100 V/cm. The strength of the magnetic field may be greater than 1 Gauss.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

Figure 1:
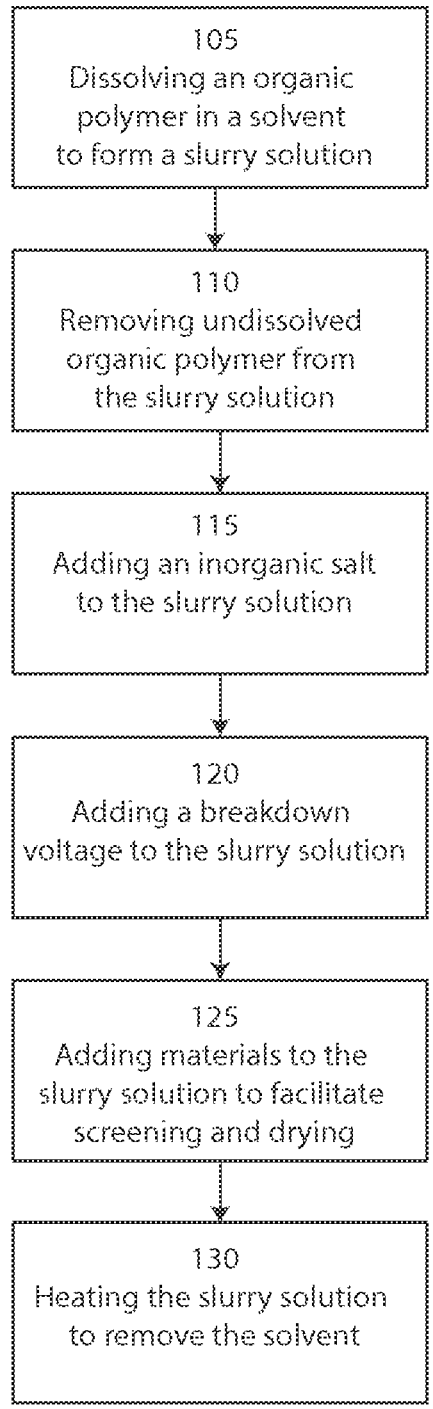
FIG. 1 is an exemplary flow chart illustrating a method for making a high permittivity dielectric material, according to an embodiment of the present disclosure.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

The present disclosure is directed to a a high permittivity low leakage capacitor and a method of forming the same.

In one or more embodiments, the methods, materials and devices described in the present disclosure reduce the difficulties associated with the manufacture of high permittivity materials, decrease the difficulty of incorporation of these materials into devices, increase the performance of the materials, and show a method whereby the materials performance may be enhanced through the use of external electronic components to increase the reliability and longevity of the device. A result of these improvements will be a decrease in the rejection ratio of such devices when manufactured and also to improve the long term reliability of the devices when in actual use. Also, the use of the methods set forth in the present disclosure will also reduce the manufacturing costs of the materials and devices and aid in the reduction of waste byproducts that would otherwise go unused for such applications.

When considering capacitors and their relationships to energy, to determine the work that must be done to charge a capacitor (i.e. the potential energy=E), the work performed is equal to the potential energy stored in the capacitor. The work performed to transfer a given amount of charge into a given capacitance is given by the following formula:

$$W = \frac{q^2}{C \cdot 2}$$

where the relationship between capacitance and charge is:

$$q = C \cdot V$$

where q=charge (coulombs)
C=capacitance (Farads)
V=electric potential (volts).

Thus, substitution for q in the work equation above provides, $$E = W = \frac{C \cdot V^2}{2}$$

where E is the energy stored in the capacitor and is equal to the work that was performed to store the charge on the capacitor.

Thus, it should be noted that the energy stored in a capacitor is related to the square of the voltage applied to the capacitor.

In one or more embodiments, it is therefore important that the voltage rating for the capacitor be as high as possible when energy storage is the primary use for the device. In one or more embodiments, besides having a high break down voltage, the capacitor also possesses a low leakage current. In other words, when the capacitor has been charged to a given voltage, the rate of charge conduction from one electrode to the other should be a relatively small value. When the capacitor is charged for energy storage over some given period of time, the rate of leakage is an acceptably low enough value that would vary depending on the use of the storage device (how long is it stored) and the "value" of the energy thus stored (how easy is it to recharge and the cost of the charge). An acceptable value for leakage would typically vary greatly from application to application. In all embodiments, leakage is something that is generally avoided and minimized.

In one or more embodiments, the highest value of relative permittivity and the highest voltage rating possible for a given level of leakage provides the best capacitor when evaluated for most energy storage applications. It should also be noted that the ability of the capacitor to "absorb" charge at a reasonable rate is also an important factor. For most electronic applications the ability of a capacitor to act as an ideal capacitor is an important parameter, especially when working at frequencies in the MHz and above. The capacitor should also have the ability to fully discharge the charge that has been placed into its electrodes. All capacitive device suffer from "irreversible dielectric absorption", but in the field of energy, discharging a capacitor to a certain level that is determined by its application will place a limit on how much of this effect is acceptable.

In one or more embodiments, substantial improvements in the voltage rating, leakage current, and dielectric of an energy storage capacitor are provided. The scope of the improvements are generally described herein as they relate to the field of energy storage, but the methods and devices described herein can further be applied to general applications wherein such improvements can be utilized to make a device that displays enhanced characteristics, including better frequency response and reduced dielectric absorption in other applications for the materials and device described herein.

In one or more embodiments, a high permittivity low leakage capacitor and energy storage device is described having the following improved characteristics:
1) High voltage rating (High break-down voltage),
2) High relative permittivities,
3) Low leakage current at maximum voltage charge,
4) Small size and weight,
5) Safe use due to low toxicity and other hazards,
6) Easy and better manufacturing procedures,
7) Environmentally friendly manufacturing,
8) High rate of discharge and charge, and
9) Ability to fully discharge.

It should be noted that previously known high permittivity materials have been subject to aging and brittleness, thereby providing substantial difficulty in forming such materials into the required shapes for their various uses. Further, since several of these previously known high permittivity materials are toxic, conventional machining and forming steps are deemed undesirable in a normal work environment. Due to their mechanical instability, the previously known high permittivity materials were also prone to electrical fatigue and mechanical fatigue when subjected to repeated electrical activations. Also, previously known high permittivity materials needed to be protected from the environmental changes, such as humidity changes, that can lead to microfractures in the material and subsequent electrical failures. There was also a need to form previously known high permittivity materials at high temperatures. Due to their somewhat complex crystalline structures and need to be formed at high temperature, it has traditionally been difficult to make high permittivity materials into thin films. Often the crystal structures were poorly formed and the thin films showed reduced permittivities as thin films versus their bulk property.

To alleviate these mechanical and electrical problems, in one or more embodiments, a permittivity material is provided that is mechanically ground and dispersed into an organic polymer for low temperature processing (i.e., temperature processing below approximately 500° C.). In different embodiments described herein, a variety of materials are described as being mixed and suspended in various polymers that possess the desired enhanced characteristics. In one or more embodiments, shellac and zein are found to offer enhanced properties for this application. In the case of both of these materials, the water and alcohol solubility of the polymer precursors provide desirable properties.

In one or more embodiments, using the mechanically ground dielectrics, the suspension of the permittivity of the dielectric in the organic binder was enhanced by approximately 25% in shellac and zein over their dry particulate forms.

In one or more embodiments, an in situ formation of the dielectric was also performed to produce unique dielectrics possessing unique characteristics. In these embodiments, the addition of $NaBH_4$ in an alcoholic solution of zein was used to produce and enhance the functionality of the mixture. The resulting mixture, when treated with concentrated ammonium hydroxide and then heated, produces greatly enhanced dielectric material with permittivity increases on the order of 250% based on their change in permittivity from their simply being mixed with the organic binders. While even greater optimization may be achieved with further experimentation, the viability of the procedure and its substantial utility have been shown by the resulting properties of such a mixture.

In one or more embodiments, the dielectric compounds when suitably ground may alternatively be mixed with silicone oil and a small amount of borax or sodium borohydride. When heated to 150° C., similar results of increases up to 250% as when the organic polymer suspensions were used.

In both of the above-described embodiments, when the mixtures were placed between two electrodes in a capacitor arrangements, the use of either the shellac, zein, or silicone oil polymers resulted in undetectable leakage currents when the voltage between the electrodes was raised to 300V. To the contrary, when dielectric material such as barium titanate was ground and pressed in between the electrodes, it showed unacceptable leakage currents when tested.

The following representative embodiments will set forth specific examples of methods of making a high permittivity material in accordance with the present disclosure. It is understood that the disclosure need not be limited to the disclosed embodiments but it is intended to cover various modifications thereof, including combinations of the steps and components of the various examples.

Procedures:

I. Procedure for Making a Reduced Leakage Current Dielectric for Use in a Capacitor or Energy Storage Device.

In one or more embodiments, 1.5 g of zein is added to 15 mL of ethanol. A small amount of water is added or optionally the solution is filtered or centrifuged to remove any undissolved particulate matter. The resulting clear solution is then treated with 0.5 g to 15 grams of high permittivity inorganic salt such as barium titanate powder that has been previously treated to be made into a nano powder or other fine dispersion material. The resulting slurry is then mixed thoroughly and screened or otherwise spread on the target electrode. Addition of a small amount of DMSO (Dimethylsulfoxide) or DMF (dimethyl formamide) will facilitate the screening and drying process. The "green sheet" material may then be dried at low temperature or alternatively clamped or otherwise pressed in contact with the other plate electrode. Elevated drying temperatures of not over approximately 60° C. (as excessive temperature can lead to bubble formation and cavitation of the film) are then maintained until all solvents have been removed. Further heating at 150° C. can be performed.

II. Procedure for Making a High Permittivity Dielectric Utilizing Low Temperature Methods In one or more embodiments, 0.75 g of strontium II carbonate is added to a stirred solution of 1.5 g gadolinium III carbonate in 15 mL of DI water. After dissolution of the two compounds takes place, a solution of 200 mg of zein (or other organic polymer) in 2 mL of water with 200 mg of sodium borohydride is added dropwise to the metal solution with good stirring. The organic polymer material is optional if the dielectric material is to be formed or isolated without binder. A small amount of acetic acid may be added to facilitate the reduction. After 5 minutes 5 mL of concentrated ammonium hydroxide is added. After 5 more minutes, the solution may be filtered and then screened, spread, or spun coated onto the desired electrode material and evaporated and treated as described in Procedure I. Or the solution can be evaporated to isolated the dielectric material as a solid.

III. Procedure for Reducing the Leakage Current in a Dielectric that has a Small Amount of Conductivity In one or more embodiments, 1.5 G of Zein is dissolved in 15 mL of ethanol. A 5 to 50 mL slurry of the desired dielectric material is then treated with the zein solution with good agitation. The slurry may then be spread, screened, or spun coated onto the electrode and treated as described in procedure I to produce a device.

IV. Procedure for Reducing the Leakage Current Utilizing Shellac and a High Permittivity Material In one or more embodiments, to a 1.5 G sample of the high permittivity material as produced by a procedure herein wherein the dielectric is isolated as a solid powder or in liquid form is added 1.5 g of commercial grade shellac solution that has been filtered or centrifuged to remove particulate matter. Additional ethanol can be added as needed to make the material into a workable slurry or solution. The resulting liquefied material can then be spread, screened or spun coated onto the electrode material as noted in procedure I.

V. Procedure for the use of Silicone Oil and a Dielectric Material as a Capacitor In one or more embodiments, 1.0 g of silicone oil is added to a finely ground high permittivity dielectric of weight from 0 to 5 g. The mixture is well stirred and a small amount of sodium borohydride or borax salt (0 to 500 mg) is added to the slurry or solution. If the solution or mixture is workable, it can then be spread, screened, or spun, onto an electrode. The sheet can then be heated to approximately 150° C. to 300° C. for a few minutes to facilitate the increase in viscosity of the silicone oil. The top electrode can then be pressed or otherwise fastened with pressure to the silicone formed electrode and then heat treated for a period of time sufficient to fully stabilize the dielectric material. For example, approximately three hours at 150 to 200° C. is sufficient, although less time and different temperatures may be acceptable.

FIG. 1 is an exemplary flow chart illustrating a method for making a high permittivity dielectric material, according to an embodiment of the present disclosure. The method begins by dissolving an organic polymer in a solvent to form a slurry solution (105). The polymer may be shellac, silicone oil and/or zein. In one embodiment, the undissolved organic polymer is removed from the slurry solution (110), for example, using a filter or centrifuge. An inorganic salt may then be added to the slurry solution (115). The inorganic salt may be a transition metal salt, such as a Gd, Sr, Sn, and/or Fe salt. In one embodiment, a breakdown voltage adjuvant may be added to the slurry solution (120). The breakdown voltage adjuvant may include one or more of Y, Ni, Sm, Sc, Tb, Yb, La, Te, Ti, Zr, Ge, Mg, Pb, Hf, Cu, Ta, Nb, and/or Bi. To facilitate screening and drying, a dimethyl formamide and a dimethylsulfoxide may be added to the slurry solution (125). The slurry solution may then be heated to a temperature of about 150° C. to about 300° C. to remove or evaporate the solvent (130).

As can be seen from the foregoing description, the present method avoids the high temperature methods associated with prior high permittivity materials by the use of organic substrates to suspend and coat the high dielectric materials. High process temperatures are also avoided by the present methods. In addition, a new method for making high permittivity materials is disclosed and when used in conjunction with the high breakdown voltage materials (such as zein), a process for making a high dielectric capacitor with a high breakdown voltage character is made possible.

Due to the nature of the process, the procedure is rugged in terms of control of leakage current. The coating material is a general material that seems to coat any material, including contamination materials and it thus will thereby make manufacture of the device easier and with better yields. Since it is difficult to make most good high permittivity dielectrics pure enough to display low conductivity (and thus producing high leakage currents), the use of organic binders in a matrix of high permittivity material is desirable because the contact of a conductive contamination or a defective crystal that may have conductivity is prevented by the coating of organic substrate.

Figure 2:
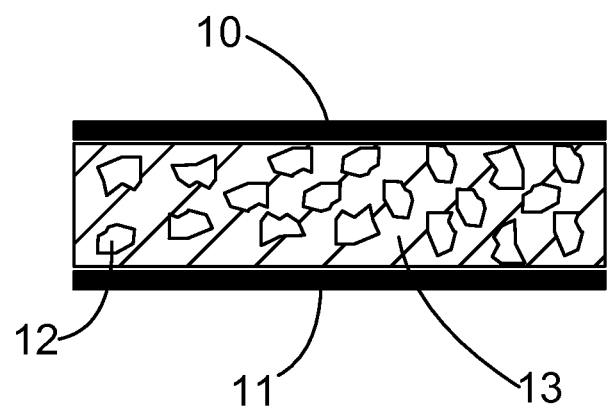
FIG. 2 is a cross-sectional view of a high permittivity low leakage capacitor, according to an embodiment of the present disclosure.

FIG. 2 is a cross-sectional view of a high permittivity low leakage capacitor, according to an embodiment of the present disclosure. As illustrated, the capacitor electrode 10 and its opposite polarity electrode 11 are spaced apart approximately equally. In the intervening space are heterogeneous dielectric materials 12 and 13. In one embodiment, a dielectric material may be formed from existing materials such as barium titanate or other such known high dielectrics, with an insulation material 13 such as zein, shellac, crosslinked silicones, or other such materials, to fill the intervening spaces between the high dielectric material 12. Due to the improvements of this invention, a low temperature process using the insulation dielectric 13 can incorporate relatively low temperature stability and melting materials.

The methods described herein provide a unique approach for making high permittivity capacitors without having to resort to standard high temperature manufacturing methods that almost no organic compound can withstand. This new approach vastly expands the materials by which these capacitors can be made, and increases the performance of the capacitors due to the reduced leakage currents that many organic polymers can display.

In one or more embodiments, Gd, Sr, Sn and Fe may be utilized as high permittivity dielectrics. In one or more embodiments, shellac, zein and silicon oil may be used as high voltage breakdown adjuvants. In other embodiments, other dielectrics and some breakdown voltage enhancers (adjuvants) may be utilized, such as but not limited to Y, Ni, Sm, Sc, Tb, Yb, La, Te, Ti, Zr, Ge, Mg, Pb, Hf, Cu, Ta, Nb, Bi.

Additionally an electronic circuit is shown wherein the leakage current for the device when in the unused and stored state can be "feed back" into the voltage charge of the primary energy storage unit. This will extend the life of the charge in the capacitor and also increase the yield from the manufacturing process.

In a capacitor with a multilayer dielectric between two electrodes, where each dielectric layer may have distinct relative permittivity, the overall permittivity is the following:

$$\frac{1}{K} = \frac{f_a}{K_a} + \frac{f_b}{K_b} + \frac{f_c}{K_c} \ldots$$

Where K=overall relative permittivity
$f_x$=volume fraction percent of layer x
$K_x$=relative permittivity of layer x The lowest permittivity layer predominates in the calculations to a very large extent when the volume fractions of the layers are relatively equal. However, when the volume fraction percent of the low permittivity material is small and permittivity of the larger bulk layer is large, then the overall permittivity of the device is less substantially compromised by the low permittivity material. This is illustrated in the table below.

TABLE 1

| | | Permittivity (K) of layer a | | |
|---|---|---|---|---|
| | | 3.0 | 6.0 | 12.0 |
| | | Permittivity (K) of layer b | | |
| $f_a$ | $f_b$ | 20000.0 K | 20000.0 K | 20000.0 K |
| 0.1 | 0.9 | 30.0 | 59.8 | 119.4 |
| 0.2 | 0.8 | 15.0 | 30.0 | 59.9 |

Thus, if the volume fractions are chosen carefully and relative permittivity of the layers is optimized, then vast improvement of the dielectric can take place. Heretofore these improvements have not been realized due to the processes, materials, and the methods defined herein having not been invented.

The aforementioned results are tempered by the ability of the dielectric to withstand substantial E-fields without dielectric breakdown or excessive leakage currents. Thus, the benefit of energy storage improvements in the permittivity can be completely negated by a reduction in the working E-field values.

A common misconception is that the permittivity of a given material is linear to the point of its breakdown voltage. Extreme non-linearity in permittivity is usually found. In certain cases (e.g., barium titanate) the reduction in permittivity can be over 100 times the low field value. Thus, increases in E-field are less productive in traditional capacitor design than thought.

A previously known general class of energy storage devices is referred to as HED (High Energy Density) capacitors. These capacitors are electrostatic capacitors that are different from EDLC (Electrical Double Layer Capacitor) type of capacitors commonly referred to as supercapacitors or ultracapacitors. As the design, manufacture, and performance of the energy storage devices disclosed herein differ in construction, materials, and overall performance so much from previously known devices for energy storage, a new term for these devices is used herein. The acronym SHED (Super High Energy Density) is a name given to a capacitor having a structure and composition according to principles of the invention. SHED capacitors have properties and a design that are most closely related to traditional electrostatic capacitors. Concomitantly, SHED capacitors have performance characteristics that are normally associated with polymer film capacitors, but the energy densities are vastly greater than that of traditional film capacitors by orders of magnitude.

Additionally, in the case of a SHED capacitor, reduced E-fields are present in the bulk dielectric and permittivity is linear with E-field. This enables substantially increased energy storage.

In a preferred embodiment, substantial improvements in the voltage rating, leakage current, and dielectric permittivity of an energy storage capacitor are realized. While the improvements as described herein relate to the field of energy storage, the methods and devices disclosed herein may be applied to other devices, imparting improved frequency response and reduced dielectric absorption.

In one or more embodiments, a high permittivity low leakage capacitor and energy storage device is described having the following improved characteristics:
 1) High voltage rating (High break-down E-field),
 2) High relative permittivity,
 3) Low leakage current at maximum voltage charge,
 4) Small size and weight,
 5) Safe use due to low toxicity and other hazards,
 6) Easy and better manufacturing procedures,
 7) Environmentally friendly manufacturing,
 8) High rate of discharge and charge, and
 9) Ability to fully discharge their electrical energy.

A process for manufacturing high permittivity high quality materials for use in a capacitor according to principles of the invention is also disclosed. Among the materials is a material referred to herein as Puralene, which is a compounds that possess the characteristics of a recognized class of materials known as parylenes. The Puralene class of materials extends into materials comprised of polymeric aromatics possessing carbon atoms alpha to aromatic moieties within the starting materials. Puralenes are one class of materials that can be used to make energy storage devices according to principles of the invention.

The varieties of dielectrics that may be used to form a capacitor are virtually limitless. To produce a substantially improved energy storage device, it requires more than simply making a dielectric and putting it between two electrodes. The method whereby the dielectric is selected, transformed, and applied is important and not obvious to those skilled in the art of electrostatic capacitor manufacture. Additionally, embodiments are described whereby certain known methods of manufacture which are commonly discounted as being unattractive methods of process are shown to be actually superior methods for the production of high energy density electrostatic capacitors.

During manufacture a magnetic or electric field or both may imposed upon the dielectric material, i.e., the dielectric material may be exposed to such fields as part of the manufacturing process. The exposure to an electric or magnetic field during processing results in a different material that exhibits increased permittivity, i.e., augmented permittivity. At low electric field potentials, the increase in permittivity is proportionally increased with the increase in the electric field potential. In some salts of inorganic metal ions the increase in the permittivity is achieved when exposed to a magnetic field. Additionally, exposure to magnetic fields enhances permittivity of organic compounds.

Simultaneous utilization of an electric field and a magnetic field can help reduce the requirements for the strength of either field with materials that respond to the magnetic field. When electric field strengths of almost any magnitude are impressed upon the dielectric, before full solidification, while the dielectric is in a pliable or less viscous state, an increase in the permittivity of the resulting dielectric is achieved. This is made possible using the low temperature processes described herein. Electric field strengths greater than 100 V/micron provide greater than 100% improvement in the permittivities of several different organic and inorganic dielectrics.

Magnetic fields may also be used to cause increases in the permittivities. Even a relatively small magnetic field (e.g., about 1 Gauss) has caused observable increases in the permittivity of polymeric materials and/or crystallization of polymers, small molecule organics, and salts of both inorganic and organic nature. Strong magnetic fields seem to induce greater amounts of permittivity increases than weak fields. Permittivities in the range of 7 to >2000 and improvements in permittivities from normal range from 5% to >6000% have been observed utilizing the methods taught.

In the case of a molecule in which there is substantial polarization and/or separation of charge due to zwitterionic structures, the acid and the base may be contained within the molecule itself. In those cases, high dielectric polarization may be achieved within a single molecule. Good permittivities may be obtained with amino acids where an acid and base chemical moiety is found. However, in many protein matrices, ionic forms may be encapsulated with the protein backbone. In the case of the protein zein, this structure is believed to produce a high permittivity dielectric when solidified under a magnetic and/or electric field.

The following representative embodiments, set forth specific examples of methods of making a high permittivity material in accordance with the present disclosure. It is understood that the disclosure need not be limited to the disclosed embodiments but it is intended to cover various modifications thereof, including combinations of the steps and components of the various examples.

Figure 3:
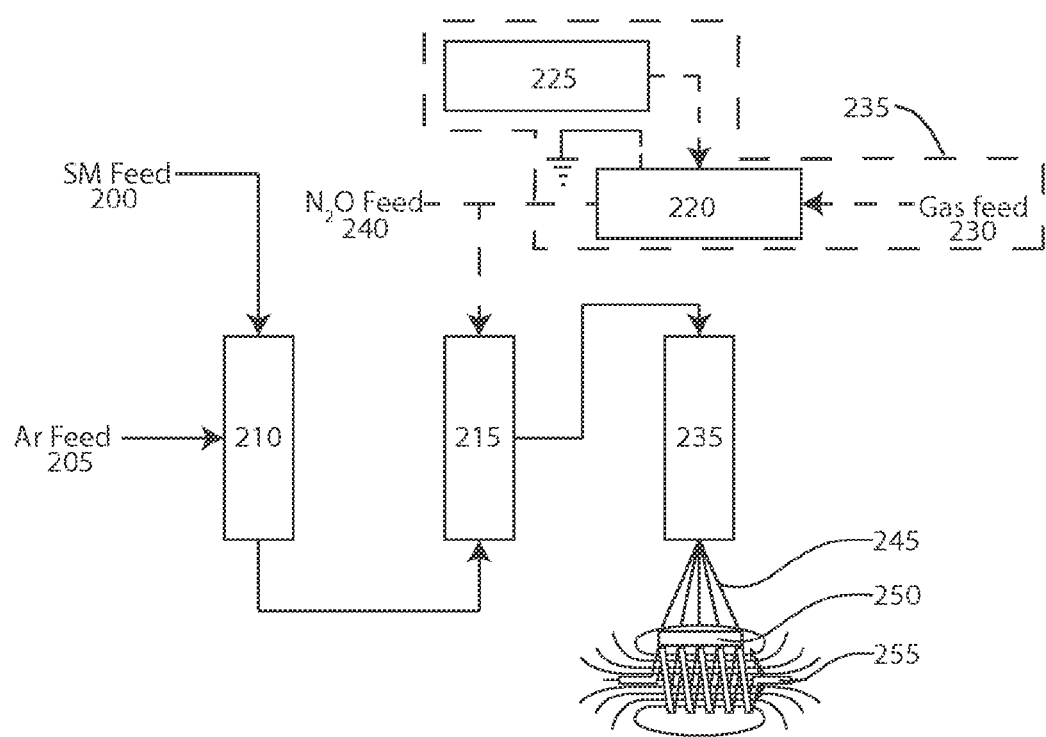
FIG. 3 is a high level flowchart that illustrates an exemplary method of producing an augmented permittivity material for use in a capacitor according to principles of the invention.
Figure 4:
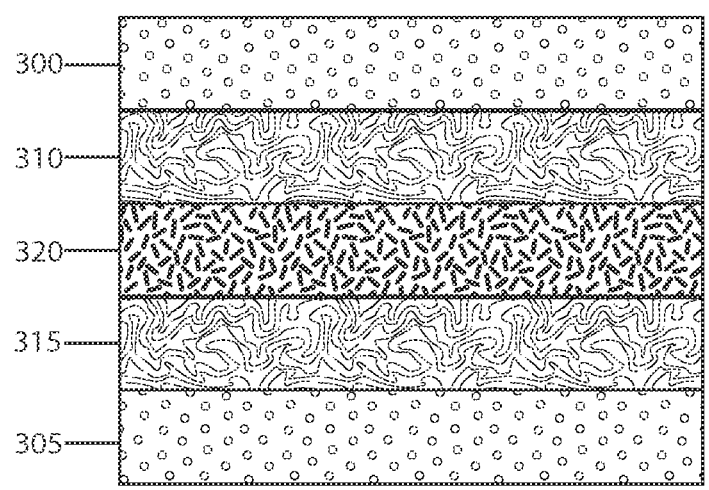
FIG. 4 is a schematic that conceptually illustrates an exemplary structure comprising layers of materials for a capacitor according to principles of the invention.

Referring now to FIG. 3, a high level flowchart that illustrates an exemplary method of producing an augmented permittivity material, e.g., Puralene, for use in a capacitor according to principles of the invention is shown. Sections, referred to chambers, may comprise tanks having an inlet and an outlet or tubular structures with an inlet and an outlet. Chamber 210 is a heated tube or other evaporation device to volatilize starting material feed 200. Starting material feed 200 is evaporated and mixed with inert gas 205 in chamber 210. Inert gas 205 may be any of a group of inert gases, such as, but not limited to, Argon. Substitution of nitrogen for argon and/or other essentially inert gases is possible. Pumps and valves may be used to propel and control the flow of fluids from one station to another.

By way of example and not limitation, chamber 210 may comprise an electrically heated Inconel (nickel alloy 600) pyrolysis reaction tube. The tube is heated to a temperature of about 450° C. to 630° C. at atmospheric pressure. A flowing stream of argon gas alone, or with a reactive compound such as nitrous oxide, is supplied to the pyrolysis reaction tube. The starter material feed 200 may be xylene vapor (Aldrich #134449-4L). If the carrier gas 205 includes a reactive compound (e.g., $N_2O$), the ratio of gases is adjusted to provide approximately molar stoichiometric ratios of 1:1 (xylene to nitrous oxide).

The heated starter material 200 in the volatile mixture with inert gas reacts with monatomic oxygen in reaction chamber 215. Being very reactive and transient, monatomic oxygen must be available to react with the volatile mixture in the reaction chamber 215. As discussed above, the source of monatomic oxygen may be a gaseous compound supplied with the carrier gas 205, or a gaseous compound supplied separately 240, or another source, such as a plasma generator 235.

Monatomic oxygen plasma may be created by exposing oxygen ($O_2$) gas at a low pressure to a high power energy source, such as an RF discharge, which ionizes the gas. Alternatively, a compound such as Nitrous Oxide ($N_2O$) may supply monatomic oxygen for the reaction. Thus, a monatomic oxygen plasma generator 235, or a monatomic oxygen chemical compound (e.g., $N_2O$) feed 240, or another suitable source of monatomic oxygen is provided.

A plasma gas can be used with the aforementioned starting materials to form the intermediate oxidized products that may subsequently react to form reaction products that are oxidized forms of the starting materials which may be monomers, dimers, trimers, oligomers, or polymers. The plasma generator 235 includes a gas feed 230 that supplies gas to a plasma reaction chamber 220. A plasma driver 225 provides high power energy to ionize the gas.

The ratio of gases is adjusted to provide approximately molar stoichiometric ratios of 1:1 (xylene to nitrous oxide or xylene to monatomic oxygen plasma). Illustratively, increased amounts of nitrous oxide result in partial and/or complete oxidation of xylene with reduced formation of the desired cyclophane or its polymer. Close control of the stoichiometry is desired in this gas phase reaction.

The reaction products are supplied to a reaction chamber 235, which is heated to approximately 450° C. to 800° C. to facilitate vaporization of the reaction products. The vaporized reaction products 245 are expelled onto a low temperature collection surface 250, where the reaction products condense and form a solid. At higher temperatures (650° C. to 800° C.) the output of the reaction chamber 235 is sufficiently hot enough to maintain the monomeric p-xylylene in monomeric form.

Condensation of the gas onto a cooled glass vessel resulted in the deposition of a colorless to cream colored solid. This solid is partially soluble in 95% ethanol. The solid was compared to a sample of [2,2']paracyclophane (Aldrich #P225-5G-A) by GC analysis (SRI#310, 15 m, megabore column, FID detector) and was shown to give identical retention times.

Rapidly cooling of the monomer onto a surface 250 results in a liquid condensation of the monomer and rapid polymerization of the monomer into a polymer. Comparison of the film thus produced appears to be identical to parylene film produced by the Gorham process. Without augmentation, permittivity of the solidified product is about 3, electric breakdown strengths are about identical at 100 V/micron, and solubility in both hot and cold solvents are below detectable levels.

In this reaction it is believed that the reactive p-xylylene reactive intermediate is formed and subsequently dimerized in the reaction tube 235 or during condensation 245 onto the substrate 250. This reaction used to synthesize the dimer, in comparison with the known "Gorham process", results in a vast improvement in the overall synthesis yield of the dimer and also results in a vast improvement in the purity of the dimer directly from the reaction. It is understood that variation in the stoichiometric amounts of the reactants may be adjusted to provide for greater or lesser yield with associated purities varying to provide a more economical process or better overall production efficiency without substantially deviating from the scope of this invention. Subsequent purifications of the materials from this reaction can be performed on this material in a manner that is much easier to accomplish than with previously taught processes. The reaction is shown below.

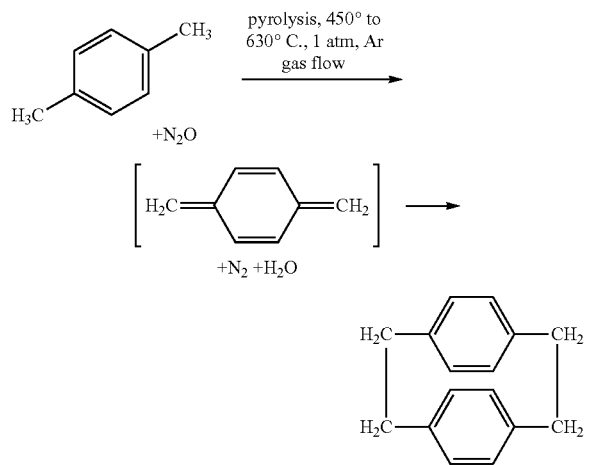

As the reaction temperature at station 235 is increased to >650° C., the deposition of the xylylene monomer can proceed directly onto a solid substrate target without necessity for isolating the intermediate dimer. Deposition of the exit gas at above 650° C. reaction temperature upon a cool glass plate resulted in formation of an ethanol insoluble substance that displays characteristics of a parylene polymer. However, solubility characteristics clearly show that the material is insoluble in all common solvents (i.e. hexane, xylene, ethyl acetate, ethanol, water).

It is believed that the reaction mechanism proceeds through a route involving the prior decomposition of nitrous oxide. Nitrous oxide is energetically unstable molecule that can be thermally decomposed at elevated temperatures. Products of the reaction are diatomic nitrogen and monoatomic oxygen. The monoatomic oxygen is able to react with itself to form diatomic oxygen, but this reaction is relatively slow. Estimates vary determining the temperature that pure thermal decomposition occurs, but estimates of 1100° C. are often cited. Catalysis of this reaction as shown below in equation 1 is known to occur with a variety of metal oxides and mixed metal oxides. Some temperatures used for nitrous oxide decomposition with certain catalysts are as low as 350° C.

Equation 1

Equation 2

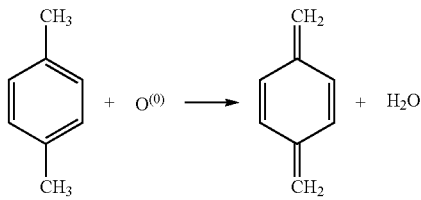

The reactive species for the process is very likely the monoatomic oxygen produced from the decomposition of the nitrous oxide. In this sense, the nitrous oxide can be viewed as a convenient carrier for the delivery of the reactive intermediate monoatomic oxygen.

In a similar manner to the nitrous oxide reaction, pure diatomic oxygen can be utilized as a reactant. However, to produce substantial yields of the desired products, activation of the oxygen is necessary. It is believed that activation of the oxygen is due to the excitation of the oxygen molecule to produce monoatomic oxygen as shown in Equation 3.

Equation 3

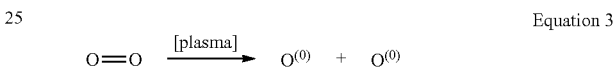

The reaction with monoatomic oxygen produced in this manner thus proceeds in a manner similar to that of the nitrous oxide decomposition route.

Cooling of the elevated temperature gases 245 exiting from the reaction tube 235 is necessary. If the reaction gas is at too high of a temperature, the ability of the reactive intermediate to condense and adhere to a surface is greatly reduced. To this end, a device to mix cool nonreactive gases into the hot reaction stream has been devised. The reaction may proceed at increased pressure (above atmospheric pressure). Accordingly, an expansion valve may be used at the exit of the reaction tube 235 to provide Joule-Thomson effect cooling of the hot gas when the gas is below its inversion temperature.

The method may be extended to other substrates such as the ones shown below.

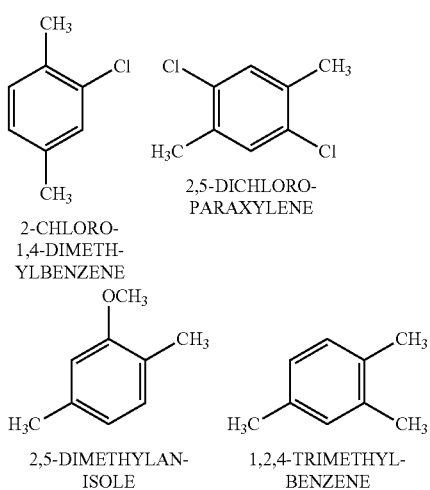

Substituents such as the ones noted above (chloro, dichloro, methoxy, and methyl) are not the only aromatic substituents that are capable of being modified by this process into reactive intermediates and their subsequent polymers. Additionally, paracyclophanes and compounds derived thereof are not exclusive to this process. Meta and ortho orientation of the substituents on the aromatic rings are also viable reaction starting materials. The reaction can be generalized to include all compounds that are capable of reaction with monatomic oxygen produced from a plasma or from decomposed nitrous oxide or its intermediate reaction products and also contain hydrogen atoms stabilized by the presence of an aromatic ring. Typically such hydrogen atoms are located in a position alpha to a phenyl ring (benzylic position). Michael structures removed from the alpha aromatic ring positions are known to give similar reactivity to the hydrogen alpha to the aromatic ring position as is well known to those versed in organic synthesis. However, the reactivity of such hydrogen atoms is not limited to alpha and/or Michael positions from an aromatic ring or the aromatic ring such as benzene. Other aromatic stabilization are known for many different rings, fused rings, and non-ring systems, as known to those versed in the art of organic chemistry. Such starting materials may preferably have the presence of two hydrogen atoms that are capable of being removed to form partially oxidized starting materials. These preferred materials may optionally have the ability to dimerize, trimerize, oligiomerize, or polymerize. The nonlimiting example used herein is p-xylene.

A preferred implementation of the invention augments permittivity of the polymer by exposing the condensing reaction products 245 to a magnetic or electric field. To the output of the reactions described above, the gaseous stream of reaction product 245 is directed to a cool solid surface 250. Illustratively, the surface target 250 may be immersed in a magnetic field 255 such as that provided by a Neodymium magnet (S84, K&J Magnetics). Other magnetic field sources may be utilized and are intended to come within the scope of the invention. Condensation of the monomer and subsequent polymerization can proceed rapidly while in the magnetic field 255. If the target and the magnet maintain the same relative orientation during the polymerization process, then a baseline increase in the electrical permittivity will occur. If the orientation of the magnetic field 255 relationship to the target is rotated during the polymerization or solid phase condensation process, then the resulting permittivity will be decreased.

When the reaction is conducted as noted above, using the p-xylylene monomer as the polymerization molecule, but without the presence of the magnetic field the relative permittivity of the material deposited is approximately 3. When the material is run as described with a magnetic flux 255 density of approximately 200 to 2000 Gauss, the relative permittivity is approximately 7. Thus, the magnetic field substantially increases the permittivity by over a factor of 2 times. In a similar manner other salts, dipoles, and salts of organic acids can be entropically oriented during solidification or polymerizations to produce enhanced high permittivity materials. Improvements in permittivity range from 10 to over 1000% may be attained.

In another implementation, the surface target 250 is immersed in an electric field 255 such as that provided by a high voltage power supply (G40, Emco, lead spacing 2" at 4000V). Condensation of the monomer and subsequent polymerization can proceed rapidly while in the electric field. If the target and the electric field maintain the same relative orientation during the polymerization process, then a baseline increase in the electrical permittivity will occur. If the orientation of the electric field relationship to the target is rotated during the polymerization or solid phase condensation process, then the resulting permittivity will be lower.

Condensation of dielectric reaction products in the presence of an electric and/or magnetic field, augments the permittivity of the condensed dielectric. This step may be applied to compounds other than parylene polymers.

When the condensation step is conducted as noted above, using maleic acid salt with guanidine as a high dielectric material, but without the presence of the electric field the relative permittivity of the material deposited is approximately 500. When the material is run as described with an electric field density of 10,000 to 30,000 V/m, the relative permittivity is approximately 25000 to 40000. Thus, the electric field substantially increases the permittivity by at least a factor of 25 in that particular case. In a similar manner other salts, dipoles, and salts of organic acids can be entropically oriented during solidification or polymerizations to produce enhanced high permittivity materials. Improvements in permittivity range from 50 to over 10000%.

The use of electrical and/or magnetic fields during the condensation process modifies the mechanical strength. The material may not be anisotropic after condensation in strong fields. Thus, this method is a way of controlling the mechanical properties of the reaction products made by this procedure.

Referring now to FIG. 6, an exemplary capacitor structure according to principles of the invention is conceptually illustrated. A removable carrier film 325 (e.g., a polymer film such as TFE or other non-stick surface material as generally known) is used as an initial substrate upon which a conductive coating 305 is deposited. This layer 305 is the first electrode. The coating 305 may be aluminum or other conductive metal or possibly a carbon coating or conductive polymer. Next, a thin coating of a high permittivity dielectric material 315, such as a Puralene polymer with augmented permittivity, is applied to the conductive coating 305 to provide a nonconductive surface 315 while the conductive coating 305 retains its conductivity in the two dimensions perpendicular to the coating plane. Subsequent to this step, a thick film of dielectric material 320 may then be applied to this surface 315 by any of a variety of methods known to those in the thick film coatings (e.g., screen coating, spin coating, vapor deposition, etc.) Optionally, then another thin coating of a high permittivity dielectric material 310, such as a Puralene polymer with augmented permittivity, is applied to the surface of this dielectric thick film 320. Finally, the exposed surface of the layers is coated or put in contact with another conductive layer 300 to form an opposite electrode from the first 305. Advantageously, the intermediate thin film dielectric layers 310, 315 substantially enhance overall permittivity in a cost effective manner, without compromising break-down E-field or increasing leakage current at maximum voltage charge. Connection and mounting of the device thus constructed is well known to those versed in this art.

An ionization process may be utilized to enable the dielectric 310, 315 to be applied as a thin film. An ionizing gas may be fed into a vapor (or atomized) material. The resulting material is electrically or magnetically augmented and directed to a removable carrier film, as described above. The carrier film has a conductive surface that is oppositely charged from the charge of the ionized dielectric. This surface then attracts the dielectric material 310, 315 to provide a smooth and uniform surface onto which the dielectric may condense. The dielectric 310, 315 is condensed in the presence of an electric and/or magnetic field onto the conductive surface. After the dielectric 310, 315 is so formed, it may be applied as a layer of a capacitor and the carrier film may be removed.

In another embodiment, the dielectric coating 310, 315 is applied by means of an ionization process as a thin film. In this embodiment, an ionizing gas is fed into a vapor (or atomized) material. The resulting material is electrically charged and directed to the carrier film. The carrier film has a conductive surface that is oppositely charged from the charge of the ionized dielectric. This surface then attracts the dielectric material to provide a smooth and uniform surface for the dielectric to condense. In this case the dielectric is condensed in the presence of an electric field onto the conductive surface. Additionally, the film surface is immersed in a magnetic field provided by a flowing electric current or a permanent magnet during the condensation or liquid spreading phase. After the dielectric 310, 315 is so formed, it may be applied as a layer of a capacitor and the carrier film may be removed.

Figure 5:
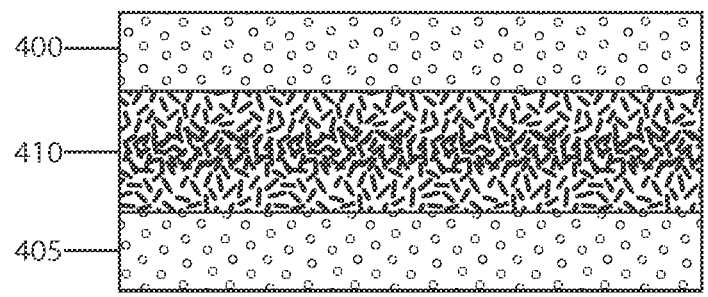
FIG. 5 is a schematic that conceptually illustrates another exemplary structure comprising layers of materials for a capacitor according to principles of the invention.

In yet another embodiment, each dielectric layer 310, 315 is applied, by means of an ionization process, as a thin film. In this embodiment the coating is applied is applied in a continuous fashion with a gradient of composition such that first a low permittivity material is applied, then a changing composition to a higher permittivity material is sequentially deposited, as conceptually illustrated in FIG. 5. The composition of the dielectric layer 410, once it reaches a certain thickness, may then have a constantly decreasing permittivity by incorporation of different layers or stepless gradient methods of deposition in liquid or vapor phase, e.g., CVD. This dielectric layer 410 is nonhomogeneous, having a permittivity gradient with permittivity being less at the dielectric-electrode interfaces 400-410, 405-410, than at the center of the dielectric 410. The dielectric 410 is disposed between electrodes 400, 405.

These methods of electrostatic capacitor manufacture are different from prior art methods and produce a structurally and functionally distinct capacitor.

The principles of the invention may be applied to film capacitors. A conventional film capacitor, which has a single layer of polymer film, exhibits the best dissipation factors and the best power delivery capabilities. Limited energy densities of film capacitors reduce their applications. With the methods described above, the limitation of energy density in the film capacitor can be substantially removed.

An insulative polymer layer 310, 315 next to the electrode 300, 305 is optional. In certain cases it is best to coat both electrodes with a coating that is thinner than would be otherwise used. This reduces the probability of a pore causing a leakage current. In addition, it may also be advantageous to the nature of the dielectric to apply an insulative layer within the bulk dielectric. This provides for better bonding and less stress when flexing the layers during handling due to the more flexible nature of the high permittivity materials in contact with the electrodes.

When a polymer for forming a SHED dielectric is chosen, a particularly excellent choice is a polymers from the parylene (poly-p-xylylene) family of polymers, which may be formed as Puralene using the method described above in relation to FIG. 3. Puralene polymer provide several advantages including 1) decreased number and size of pores, 2) low cost, 3) freedom from defects with self-healing properties, 4) ease of use and low cost of application, and 5) ability to have custom modifications of chemical and morphological structure. As a very cost effective choice Puralene is a preferred polymer for a capacitor according to principles of the invention. However, other methods for forming pore-free coatings are known and can used in the manner described herein. Thus, the invention is not limited to the Puralene family of polymers and related derivative structures.

As can be seen from the foregoing description, the present method avoids the high temperature methods greater than 500° C. at the dielectric formation site. This allows for the use of lower temperature polymers such as organic polymers. In addition, the high permittivity dielectric may be used in conjunction with other high dielectric materials that normally would be unsuitable as capacitor dielectrics.

A capacitor according to principles of the invention controls leakage current. The coating material coats and insulates, including contaminants. This enables manufacture of the device with fewer defects and with better production yields. Since it is difficult to make most high permittivity dielectrics pure enough to display low conductivity (and thus producing high leakage currents), the use of organic polymers produced directly on the electrodes is superior to conventional polymers and dielectrics commonly found in electrostatic capacitors.

The formation of the enhanced dielectric material in the presence of an electric field is believed to be a result of the orientation of the electrostatic charges and dipoles that are in the resulting mixed matrix of dielectric. The field causes an ordering of the polymer or the solid matrix in a largely entropically more ordered arrangement at a higher energy. This, in and of itself, does not cause an increase in permittivity, but it does allow for the less polar portions of the dielectric to assume different energetically favored arrangements within the solid matrix in the presence of an electric field than in the absence of the field. In the absence of the ordering effect in the solid dielectric, the total energy difference in conformational changes that take place with the electric field versus the total energy in the absence of the field are smaller. This arrangement is referred to herein as an "electric field ordered solid matrix," which appreciably augments permittivity. A polymer having an electric field ordered solid matrix exhibits an augmented permittivity.

It would be understandable if the sensitivity of the solid dielectric to magnetic field effects during the solidification process for the polymer or other solidification process showed little effect. This is not the case, however. During any chemical reaction process there is a certain amount of radical character. It is believed that induced free electron radicals modify the course of the solidification process during the chemical reaction due to its interaction with the magnetic field during certain transition states and/or radical intermediate species and induced changes to the overall permittivity of the resultant polymer or other chemical species. In the case of the methods for the formation of high permittivity materials, this effect has been found to be profound to the overall performance of the energy storage device. This type of substance is referred to as having "radical intermediate species" induced by a magnetic field, which augments permittivity. A polymer having a magnetic field induced radical intermediate specie, exhibits an augmented permittivity.

The methods described herein provide a unique approach for making high permittivity capacitors without having to resort to standard high temperature manufacturing methods that almost no organic compound can withstand. This new approach vastly expands the materials by which these capacitors can be made, and increases the performance of the capacitors due to the reduced leakage currents that many organic polymers can display. Additionally, these materials may be manufactured in a manner to form large area films with enhanced dielectric properties.

One method for the manufacture of a SHED capacitor according to principles of the invention is to use a PET film as a carrier film (such as 0.5 to 6 inches in width), and deposit the layers as noted above on a roll to roll machine. Methods to deposit the dielectric materials are known to those versed in the art of film deposition. Typically a 10 micron thick coating of the dielectric may be deposited by vapor phase evaporation and the electrodes may be 0.5 microns in thickness. This coated film can be rolled into a cylinder and edge connection attached as known to those in this area of production.

In sum, An exemplary method for creating a high permittivity dielectric material includes the following steps: creating a wetting agent solution by adding an amount an organic polymer to a solvent suspension and mixing the solution; processing the wetting agent solution to remove any particulate matter not dissolved into the solvent suspension; combining the wetting agent solution with a high permittivity dielectric particulate; mixing the wetting agent solution with the high permittivity dielectric particulate such that a slurry is created; applying the slurry to a substrate; and curing the slurry. By way of example and not limitation, the organic polymer may include a polymer from the group consisting of shellac, zein, silicone oil polymer, and poly-p-xylylene polymer. In particular, a monatomic oxygen synthesized poly-p-xylylene polymer as described herein is preferred.

The high permittivity dielectric particulate may be a high permittivity inorganic salt. Nonlimiting examples include barium titanate, sodium borohydride, sodium borohydride and a borax salt, or a transition metal salt such as a Gd salt, Sr salt, Sn salt, and Fe salt.

A voltage adjuvant may be added to the slurry. Nonlimiting examples include Y, Ni, Sm, Sc, Tb, Yb, La, Te, Ti, Zr, Ge, Mg, Pb, Hf, Cu, Ta, Nb, Bi, and compounds based thereon.

An electric field and/or magnetic field may be applied across the substrate before completion of curing of the slurry. The strength of the electric field may be greater than 100 V/cm.

The magnetic field may be applied across the substrate by placing the slurry applied to the substrate between magnetic poles of a magnetic source such that magnetic field between the magnetic poles of the magnetic source is parallel to the substrate. The strength of the magnetic field may be greater than 1 Gauss.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A method for creating a high permittivity dielectric material comprising:

creating a wetting agent solution by adding an amount an organic polymer to a solvent suspension and mixing said solution;

processing said wetting agent solution to remove any particulate matter not dissolved into said solvent suspension;

combining said wetting agent solution with a high permittivity dielectric particulate;

mixing said wetting agent solution with the high permittivity dielectric particulate such that a slurry is created;

applying said slurry to a substrate; and curing said slurry.

2. A method for creating a high permittivity dielectric material according to claim 1, further comprising a step of applying an electric field across said substrate before completion of curing of said slurry.

3. A method for creating a high permittivity dielectric material according to claim 2, wherein the strength of said electric field is greater than 100 V/cm.

4. A method for creating a high permittivity dielectric material according to claim 3, further comprising a step of applying a magnetic field across said substrate before solidification of said slurry.

5. A method for creating a high permittivity dielectric material according to claim 4, wherein the step of applying a magnetic field across said substrate includes placing the slurry applied to the substrate between magnetic poles of a magnetic source such that magnetic field between the magnetic poles of said magnetic source is parallel to the substrate.

6. A method for creating a high permittivity dielectric material according to claim 5, whereby the strength of said magnetic field is greater than 1 Gauss.

7. A method for creating a high permittivity dielectric material according to claim 4, wherein the magnetic field is perpendicular to the substrate.

8. A method for creating a high permittivity dielectric material according to claim 1, further comprising a step of applying a magnetic field across said substrate before completion of curing of said slurry.

9. A method for creating a high permittivity dielectric material according to claim 8, wherein the magnetic field is perpendicular to the substrate.

10. A method for creating a high permittivity dielectric material according to claim 9, whereby the strength of said magnetic field is greater than 1 Gauss.

11. A method for creating a high permittivity dielectric material according to claim 8, wherein the step of applying a magnetic field across said substrate includes placing the slurry applied to the substrate between magnetic poles of a magnetic source such that magnetic field between the magnetic poles of said magnetic source is parallel to the substrate.

12. A method for creating a high permittivity dielectric material according to claim 1, further comprising adding a breakdown voltage adjuvant to the slurry.

13. A method for creating a high permittivity dielectric material according to claim 12, said breakdown voltage adjuvant comprising an element from the group consisting of Y, Ni, Sm, Sc, Tb, Yb, La, Te, Ti, Zr, Ge, Mg, Pb, Hf, Cu, Ta, Nb, and Bi.

14. A method for creating a high permittivity dielectric material according to claim 12, said breakdown voltage adjuvant comprising a compound containing an element from the group consisting of Y, Ni, Sm, Sc, Tb, Yb, La, Te, Ti, Zr, Ge, Mg, Pb, Hf, Cu, Ta, Nb, and Bi.

15. A method for creating a high permittivity dielectric material according to claim 1, said organic polymer comprising a polymer from the group consisting of shellac, zein, silicone oil polymer, and poly-p-xylylene polymer.

16. A method for creating a high permittivity dielectric material according to claim 1, said organic polymer comprising a monatomic oxygen synthesized poly-p-xylylene polymer.

17. A method for creating a high permittivity dielectric material according to claim 1, said high permittivity dielectric particulate comprising a high permittivity inorganic salt.

18. A method for creating a high permittivity dielectric material according to claim 1, said high permittivity dielectric particulate comprising a compound from the group consisting of barium titanate, sodium borohydride and a borax salt.

19. A method for creating a high permittivity dielectric material according to claim 1, said high permittivity dielectric particulate is a transition metal salt.

20. A method for creating a high permittivity dielectric material according to claim 1, said high permittivity dielectric particulate is a transition metal salt from the group consisting of a Gd salt, Sr salt, Sn salt, and Fe salt.

* * * * *